United States Patent
Sato et al.

(10) Patent No.: US 8,992,334 B2
(45) Date of Patent: Mar. 31, 2015

(54) FLEXIBLE SHAFT COUPLING AND METHOD OF MANUFACTURING THE SAME

(71) Applicant: Miki Pulley Co., Ltd., Kawasaki-shi, Kanagawa (JP)

(72) Inventors: Tatsuya Sato, Machida (JP); Shigeyuki Hattori, Yamato (JP); Takayuki Satomi, Ayase (JP); Junpei Kajiyama, Yamato (JP)

(73) Assignee: Miki Pulley Co., Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 14/064,508

(22) Filed: Oct. 28, 2013

(65) Prior Publication Data

US 2014/0116608 A1    May 1, 2014

(30) Foreign Application Priority Data

Oct. 31, 2012 (JP) ................. 2012-240858

(51) Int. Cl.
*F16D 3/68* (2006.01)
*F16D 3/74* (2006.01)

(52) U.S. Cl.
CPC ... *F16D 3/74* (2013.01); *F16D 3/68* (2013.01)
USPC .......................................................... 464/73

(58) Field of Classification Search
CPC ........................................................ F16D 3/74
USPC ............... 464/73, 94–96; 156/245; 264/297.2
See application file for complete search history.

(56) References Cited

U.S. PATENT DOCUMENTS

| | | | | |
|---|---|---|---|---|
| 2,535,338 A | * | 12/1950 | Wilcox | ............................ 464/95 |
| 3,396,556 A | | 8/1968 | Giegerich | |
| 4,172,369 A | * | 10/1979 | Hayes et al. | .................... 464/73 |
| 8,505,675 B2 | | 8/2013 | Suzuki et al. | |

FOREIGN PATENT DOCUMENTS

| | | |
|---|---|---|
| JP | S48-25939 Y | 7/1973 |
| JP | 10331063 A | 12/1998 |
| JP | 2004176880 A | 6/2004 |
| JP | 2004286181 A | 10/2004 |
| JP | 4315453 B2 | 8/2009 |
| JP | 4621728 B2 | 1/2011 |

* cited by examiner

*Primary Examiner* — Gregory Binda
(74) *Attorney, Agent, or Firm* — Marshall & Melhorn, LLC

(57) ABSTRACT

A flexible shaft coupling demonstrates a high performance in transmitting torque and accommodating positional deviations, and is yet highly durable. A first elastomer member (82) having a relatively high rubber hardness is circumferentially interposed between a first claw (32) of a first shaft coupling member (20) and a second claw (62) of a second shaft coupling member (50), and a second elastomer member (84, 86) having a lower rubber hardness than the first elastomer member is interposed between a surface portion (end surface) (30) of the first shaft coupling member (20) and the second claw (62) and/or between a surface portion (end surface) (60) of the second shaft coupling member (50) and the first claw (32).

5 Claims, 5 Drawing Sheets

FLEXIBLE SHAFT COUPLING AND METHOD OF MANUFACTURING THE SAME

BACKGROUND OF THE INVENTION

The present invention relates to a flexible shaft coupling and a method of manufacturing the same, and in particular to a flexible shaft coupling using a rubber member or an elastomer member for an intermediate element thereof and a method of manufacturing the same.

Some of the known flexible couplings comprise a first shaft coupling member fixed to an end of a first shaft member, a second shaft coupling member fixed to an end of a second shaft member and an elastomer member (elastic rubber member) serving as an intermediate member connecting the first and second shaft coupling members to each other. See JPS48-25939Y, JPH10-331863A, JP2004-286181A, JP4315453B and JP4621728B.

In connection with such flexible shaft couplings, it has been proposed to improve a torque transmission efficiency, a capability to withstand repeated compression and a capability to absorb vibrations by appropriately selecting the modulus of repulsion elasticity and the rubber hardness of the elastomer member (see JP 10-331863A, for instance), to improve responsiveness by increasing the torsional spring constant of the elastomer member in the direction of rotation (circumferential direction) to an appropriate level by suitably selecting the thickness of the elastomer member (see JP4315453B, for instance), and to allow the vibrations in the axial direction to be buffered by extending the elastomer member in the axial direction (thrust direction) up to the end surface of the coupling member (see JP2004-286181A, for instance).

Even when a first shaft member and a second shaft member which are to be coupled with each other are radially offset from each other, when the axial lines of the first and second shaft members are at an angle to each other, and/or when the axial distance between the opposing ends of the first and second shaft members is varied, a flexible shaft coupling can accommodate such a deviation by means of the elastic deformation of an elastomer member.

For the elastomer member to be able to accommodate positional deviations such as radial offset, angular offset and axial offset between the first and second shaft members by means of elastic deformation thereof, it is preferable that the elastomer member is made of soft rubber material having a low rubber hardness. On the other hand, the softer the elastomeric material is, the greater will be the radial elastic deformation of the elastomer member when transmitting a given torque between the first and second shaft members.

Therefore, when a soft rubber material is used for the elastomer member with the aim of accommodating the positional deviation between the first and second shaft members, not only the rotational angular difference between the first and second shaft members may increase to an unacceptable level but also the durability of the elastomer member may be reduced and the service life of the shaft coupling may be reduced.

If the elastomer member is made of a hard rubber material, the rotational angular difference between the first and second shaft members may not increase to an unacceptable level, and the durability of the elastomer member may not be reduced. However, when there is a significant positional deviation between the first and second shaft members as is often the case where a flexible shaft coupling is required, the positional deviation causes a persistent stress to the elastomer member in addition to the stress caused by the normal transmission of torque.

In particular, the stress owing to the positional deviation between the two shaft coupling parts may be produced in highly localized parts of the elastomer member, and this could cause an unpredictable fatigue or other damages to the elastomer member. Also, the use of a hard rubber material for the elastomer member may reduce the capability of the shaft coupling to accommodate the positional deviation between the first and shaft members.

It is also conceivable to place the elastomer material only in parts of the flexible shaft coupling where the elastomer material is loaded solely by the torque that is to be transmitted, and not by the stresses caused by the angular and other positional deviations between the first and second shaft coupling members of the flexible shaft coupling. For instance, each shaft coupling member may be provided with a plurality of claws arranged circumferentially at a regular angular interval and projecting toward the other shaft coupling member such that the claws of the two shaft coupling members interdigitate one another. If the elastomer material is filled only into the circumferential gaps between the adjacent claws, the elastomer material fully receives the loading caused by the torque transmission but is not substantially subjected to loadings owing to the positional deviations between the two shaft coupling members. However, the molding die that would be required for manufacturing such a flexible shaft coupling is so complex that a relatively high manufacturing cost would be required.

SUMMARY OF THE INVENTION

In view of such problems of the prior art, a primary object of the present invention is to eliminate the problems associated with the conflicting requirements in a flexible shaft coupling, and to provide a flexible shaft coupling which demonstrates a high performance in transmitting torque and accommodating positional deviations, and is yet highly durable.

According to the present invention, such objects can be accomplished by providing a flexible coupling (10), comprising a first shaft coupling member (20) fixed to an end of a first shaft member (100); a second shaft coupling member (50) fixed to an end of a second shaft member (110); and an elastomer member (80) connecting the first and second shaft coupling members to each other: wherein the first and second shaft coupling members are provided with surface portions (30, 60) opposing each other; the first shaft coupling member is provided with a first claw (32) projecting from the surface portion thereof toward the surface portion of the second shaft coupling member; the second shaft coupling member is provided with a second claw (62) projecting from the surface portion thereof toward the surface portion of the first shaft coupling member; the first and second claws are angularly displaced from each other so as to be circumferentially spaced from each other, and are axially spaced from the opposing surface portions of the second and first shaft coupling members, respectively; and a first elastomer member (82) having a relatively high rubber hardness is circumferentially interposed between the first and second claws, and a second elastomer member (84, 86) having a lower rubber hardness than the first elastomer member is interposed between the surface portion of the first shaft coupling member and the second claw and/or between the surface portion of the second shaft coupling member and the first claw.

According to this structure, the positional deviation between the first shaft member (100) and the second shaft member (110) can be accommodated by the relatively soft second elastomer member (84, 86). It should be noted that the terms "soft" and "hard" as used herein mean the "compliant (low stiffness)" and "stiff (high stiffness)" properties of the elastomeric material. Therefore, because the second elastomer member is relatively soft, it produces less stress for a given strain or a given deformation, as opposed to the first elastomer member which produces a relatively large stress for a given strain or deformation because the first elastomer member is relatively hard.

The first and second shaft members are not required to be both normal shaft members. For instance, one of the shaft members may consist of a part of a device for providing a torque or receiving a torque which may not be considered as a shaft member in a normal sense.

The torque transmission between the first shaft member (100) and the second shaft member (110) is effected via the relatively hard first elastomer member (82). Therefore, the first elastomer member (82) is not constantly subjected to the initial elastic deformation owing to the positional deviation between the first shaft member (100) and the second shaft member (110), and the excessive increase in the angular deviation between the first shaft member (100) and the second shaft member (110) in the rotational direction can be avoided so that the durability of the first elastomer member (82) can be enhanced.

Preferably, in the flexible shaft coupling of the present invention, the surface portion (30) of the first shaft coupling member (20) opposes the end surface (64) of the second claw (62) and the surface portion (60) of the second shaft coupling member (50) opposes the end surface (34) of the first claw (32), in each case by planes that are parallel to each other and perpendicular to the axial direction, and the second elastomer member (84, 86) is interposed between the mutually opposing planes as a layer.

According to this arrangement, even when a relative angular displacement is produced between the first and second shaft coupling members (20, 50) in the rotational direction as torque is transmitted between the first and second shaft coupling members (20, 50), the second elastomer member (84, 86) merely undergoes a twisting deformation, and is not subjected to any significant axial compressive deformation. Therefore, no axial loading is produced between the first shaft member (100) connected to the first shaft coupling member (20) and the second shaft member (110) connected to the second shaft coupling member (50).

Preferably, in the flexible shaft coupling of the present invention, the first elastomer member (82) is bonded to at least a part of the circumferentially opposing surfaces of the first and second claws (32, 62), the second elastomer member (84, 86) is bonded to the surface portion (30) of the first shaft coupling member (20) and/or the surface portion (60) of the second shaft coupling member (50), and the first and second elastomer members (82, 84, 86) are provided with mutually opposing axial end surfaces that are bonded to each other. The first elastomer member and the second elastomer member may consist of individual pieces of elastomer members which are bonded to various parts by using a bonding agent, but more preferably molded in situ as a single elastomer, and bonded to each other and to other parts at least partly by vulcanization that occurs during the process of molding the first elastomer member and the second elastomer member.

Thereby, the first shaft coupling member (20) and the second shaft coupling member (50) are joined to each other solely by the first and second elastomer members (82, 84, 86) in both the circumferential and axial directions.

The present invention also provides a method of manufacturing the flexible shaft coupling discussed above, and this method comprises a first step of bonding the second elastomer member (84, 86) to one of the surface portions (30, 60) of the first and second shaft coupling members (20, 50) by using a first molding die (120); and a second step of placing the first and second shaft coupling members (20, 50) in finished positions thereof, and fixedly filling the first elastomer member (82) in a circumferential gap defined between the first and second claws (32, 62) (such gap being shown between the first claw 32 and the second claw 62 in FIG. 1) by vulcanization by using a second molding die (130).

Therefore, in the second step, the second elastomer member serves as a part of the second molding die, and the entire elastomer member or the assembly of the first elastomer member and the second elastomer member (84, 86) can be molded by using simple molding dies.

According to this method, the first elastomer member (82) may be bonded to the circumferentially opposing surfaces of the first and second claws (32, 62) by vulcanization, and the second elastomer member (84, 86) may be bonded to the surface portion (30) of the first shaft coupling member (20) and/or the surface portion (60) of the second shaft coupling member (50). Furthermore, the first elastomer member (82) may be bonded to the second elastomer member (84, 86) at the mutually opposing end surfaces thereof by vulcanization to complete the flexible shaft coupling (10).

According to the flexible shaft coupling of the present invention, the first and second elastomer members are made of different rubber materials having different rubber hardnesses so as to play different roles such that the mutually conflicting requirements can be favorably resolved. As a result, the present invention provides a flexible shaft coupling which is superior in both the capability to transmit torque and to accommodate positional deviations, and is highly durable at the same time.

DETAILED DESCRIPTION OF THE INVENTION

Figure 1:
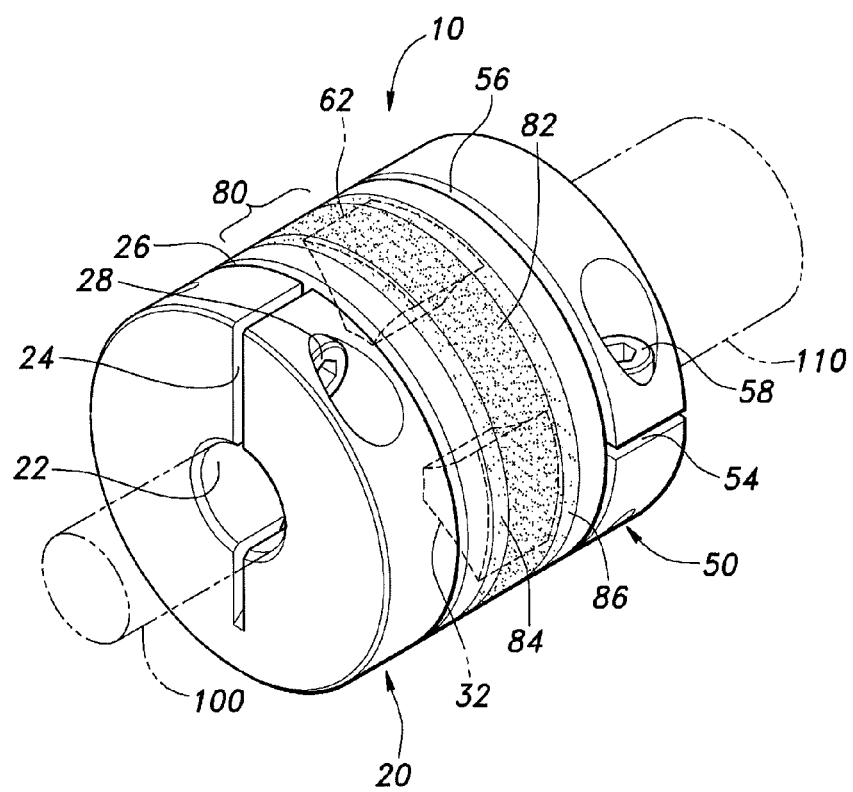
FIG. 1 is a perspective view showing a flexible shaft coupling embodying the present invention.

An embodiment of the flexible shaft coupling according to the present invention is described in the following with reference to FIGS. 1 to 3.

The flexible shaft coupling 10 includes a first shaft coupling member 20 configured to be fixed to an end of a first shaft member 100, a second shaft coupling member 50 configured to be fixed to an opposing end of a second shaft member 110 and an elastomer member 80 serving as an intermediate element that connects the first and second shaft coupling members 20 and 50 to each other in a coaxial relationship.

The first shaft coupling member 20 is provided with an annular shape and is formed with a central through hole 22 for receiving the first shaft member 100 therein, a radial slot 24 extending radially and having an open end on the outer circumferential surface thereof and a circumferential slot 26 extending around a large part thereof including a part where the radial slot 24 is formed. Similarly, the second shaft coupling member 50 is provided with an annular shape and is formed with a central through hole 52 for receiving the second shaft member 110 therein, a radial slot 54 extending radially and having an open end on the outer circumferential surface thereof and a circumferential slot 56 extending around a large part thereof including a part where the radial slot 54 is formed. The radial slot 24 of the first shaft coupling member 20 and the radial slot 54 of the second shaft coupling member 50 are at a rotational angle of 90 degrees relative to each other.

The first shaft coupling member 20 is formed with a bolt receiving hole (not shown in the drawings) and a threaded hole (not shown in the drawings) on either side of the radial slot 24. A fastening bolt 28 is passed into the bolt receiving hole and threaded into the threaded hole so as to extend across the radial slot 24. By tightening the fastening bolt 28, the radial slot 24 is reduced in width and the through hole 22 is reduced in diameter so that the first shaft member 100 having the end thereof received in the through hole 22 is integrally joined to the first shaft coupling member 20.

Likewise, the second shaft coupling member 50 is formed with a bolt receiving hole (not shown in the drawings) and a threaded hole (not shown in the drawings) on either side of the radial slot 54. A fastening bolt 58 is passed into the bolt receiving hole and threaded into the threaded hole so as to extend across the radial slot 54. By tightening the fastening bolt 58, the radial slot 54 is reduced in width and the through hole 52 is reduced in diameter so that the second shaft member 110 having the end thereof received in the through hole 52 is integrally joined to the second shaft coupling member 50.

The mutually opposing ends of the first and second shaft coupling members 20 and 50 are each formed as a planar surface portion 30, 60. The planar surface portions 30 and 60 oppose each other in a mutually parallel relationship by extending perpendicularly to the thrust (axial) direction.

The planar surface portion 30 is integrally formed with a pair of first claws 32 projecting toward the other planar surface portion 60. Similarly, the planar surface portion 60 is integrally formed with a pair of second claws 62 projecting toward the other planar surface portion 30. Each one of the first and second claws 32 and 62 is provided with a planar end surface 34, 64 extending perpendicularly to the thrust (axial) direction.

The first claws 32 are angularly displaced from each other by 180 degrees along the circumferential direction, and so are the second claws 62. The first claws 32 are angularly offset from the second claws 62 by 90 degrees. The first and second claws 32 and 62 are in an overlapping relationship by a certain axial length as seen in the circumferential direction. Also, a certain axial gap is defined between the end surfaces of the first and second claws 32 and 62 and the opposing planar surface portions 30 and 60 of the second and first shaft coupling members 50 and 20, respectively. More specifically, the end surface 34 of each first claw 32 opposes the corresponding planar surface portion 60 at a certain gap in a mutually parallel relationship, and the end surface 64 of each second claw 62 opposes the corresponding planar surface portion 30 at a certain gap in a mutually parallel relationship.

The circumferential gaps between the first and second claws are each filled with a first elastomer member 82 having a relatively high rubber hardness and vulcanized therein. A second elastomer member 84, having a lower rubber hardness than the first elastomer member 82, is attached to the entire surface of the planar surface portion 30 (excluding the parts where the first claws 32 are provided) and the end surfaces 64 of the second claws 62 as a layer of a uniform thickness by vulcanization (crosslinking). Likewise, a second elastomer member 86, having a lower rubber hardness than the first elastomer member 82, is attached to the entire surface of the planar surface portion 60 (excluding the parts where the second claws 62 are provided) and the end surfaces 34 of the first claws 32 as a layer of a uniform thickness by vulcanization.

In the illustrated embodiment, each of the elastomer members 82, 84 and 86 are provided with a circumferential layer which extends over the entire circumference thereof. Therefore, when the shaft coupling 10 is finally assembled, these circumferential layers of the elastomer members 82, 84 and 86 define a fully closed, cylindrical outer profile of the flexible part of the shaft coupling 10.

The axial end surfaces of the first elastomer member 82 oppose the end surfaces of the second elastomer members 84 and 86, respectively, in a mutually parallel relationship and are bonded thereto by vulcanization. In other words, the second elastomer members 84 and 86 are provided with end surfaces that oppose the corresponding end surfaces of the first elastomer member 82, and these opposing end surfaces are bonded to one another by vulcanization. Thus, the intermediate element 80 consists of a combined elastomer member formed by joining the two second elastomer members 84 and 86 to the opposing end surfaces of the first elastomer member 82.

The rubber hardness of the first elastomer member 82 is preferably selected such that the elastomer member 82 does not experience any excessive compressive deformation when transmitting torque between the first shaft coupling member 20 and the second shaft coupling member 50 (or between the first shaft member 100 and the second shaft member 110), and an adequate durability can be attained, the preferred rubber hardness of the first elastomer member 82 being typically in the range of 50 to 80 (JIS A50 to JIS A80). The rubber hardness of the second elastomer members 84 and 86 is preferably selected such that a positional deviation between the first shaft member 100 and the second shaft member 110 can be accommodated by elastic deformation, and is typically in the range of 30 to 40 (JIS A30 to JIS A40). Further, the first shaft coupling member 20 and the second shaft coupling member 50 are typically made of metallic, ceramic or hard plastic material for a high mechanical strength, but may also be made of elastomeric material having a suitable damping coefficient depending on each particular application.

The first elastomer member 82 and the second elastomer members 84 and 86 may be made of any elastomeric material, such as nitrile rubber, urethane rubber, polyurethane polymer, etc., and may have different rubber hardnesses and damping coefficients by using a same rubber material having different compositions or by using different rubber materials.

In this flexible coupling 10, the positional deviation between the first shaft member 100 and the second shaft member 110, such as a radial offset, an angular offset and an axial offset, can be accommodated by the second elastomer members 84 and 86 which are relatively soft without requiring an elastic deformation of the first elastomer member 82. The torque transmission between the first shaft member 100 and the second shaft member 110 is primarily accomplished by the first elastomer member 82 which is relatively hard. Therefore, the first elastomer member 82 is not required to be constantly subjected to an initial elastic deformation owing to the positional deviation between the first shaft member 100 and the second shaft member 110 so that the angular difference between the first shaft member 100 and the second shaft member 110 in the rotational direction is prevented from becoming excessive, and the durability of the first elastomer member 82 is not compromised.

Thus, by having the first elastomer member 82 and the second elastomer members 84 and 86 which are made of different rubber materials having different rubber hardnesses play different roles, the problems associated with the mutually conflicting requirements can be eliminated, and the flexible coupling 10 can be made superior in both the torque transmitting performance and the positional deviation accommodating performance while retaining the benefits of a high durability.

The planar surface portion 30 of the first shaft coupling member 20 and the end surface 64 of each second claw 62 oppose each other both extending in a mutually parallel relationship, and the planar surface portion 60 of the second shaft coupling member 50 and the end surface 34 of each first claw 32 oppose each other both extending in a mutually parallel relationship. The second elastomer members 84 and 86 are interposed between these opposing parts as a layer of a constant thickness. Therefore, when torque is transmitted between the first and second shaft coupling members 84 and 86, and the resulting elastic deformation of the first elastomer member 82 causes a relative rotational angular displacement between the first and second shaft coupling members 84 and 86, the second elastomer members 84 and 86 are merely twisted, and not subjected to any axial compressive deformation. Therefore, no substantial axial force is produced between the first shaft member 100 connected to the first shaft coupling member 20 and the second shaft member 110 connected to the second shaft coupling member 50.

The first elastomer member 82 is bonded to the circumferentially opposing surfaces of the first and second claws 32 and 62 by vulcanization, the second elastomer members 84 and 86 are bonded to the planar surface portions 30 and 60 of the first and second shaft coupling members 20 and 50 by vulcanization, and the first elastomer member 82 is bonded to the second elastomer members 84 and 86 at the opposing axial end surfaces thereof by vulcanization. Therefore, the first and second shaft coupling members 20 and 50 are joined both in the circumferential direction and the axial direction solely by the first elastomer member 82 and the second elastomer members 84 and 86.

A method of manufacturing the flexible shaft coupling 10 is described in the following with reference to FIGS. 1 to 5.

Figure 4:
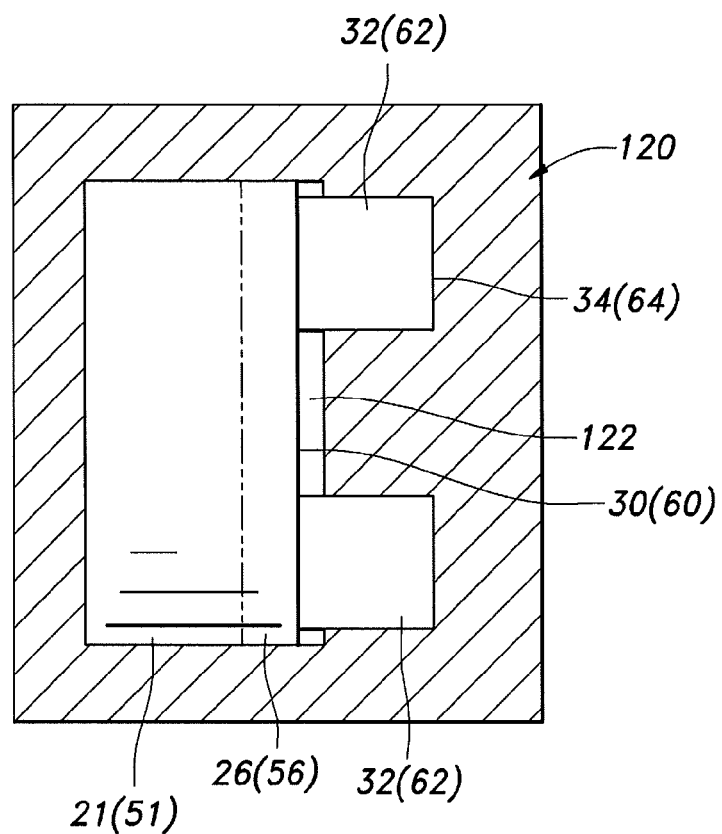
FIG. 4 is a diagram showing a first step of the method of manufacturing the flexible shaft coupling using a first molding die according to the present invention.

First of all, as a first step, a first shaft coupling member blank 21 is placed in a first molding die 120 consisting of two halves as shown in FIG. 4. The first shaft coupling member blank 21 consists of a cylindrical member foamed with the first claws 32 or the first shaft coupling member 20 minus the through hole 22, the radial slot 24, the circumferential slot 26, the bolt receiving hole and the threaded hole. When the first molding die 120 is closed with the first shaft coupling member blank 21 received therein, a chamber is 122 is defined between the planar surface portion 30 of the first shaft coupling member blank 21 (excluding the parts where the first claws 32 are formed) and the opposing inner surface of the first molding die 120.

Molten elastomeric material under pressure is injected into the chamber 122 via gates (not shown in the drawings) which are provided in suitable parts of the first molding die 120, and vulcanized therein. As a result, the second elastomer member 84 is formed on the planar surface portion 30 of the first shaft coupling member blank 21 as a layer of a prescribed thickness.

Then, a second shaft coupling member blank 51 is placed in the first molding die 120 in a similar fashion as the first shaft coupling blank member 21. The second shaft coupling member blank 51 consists of a cylindrical member formed with the second claws 62 or the second shaft coupling member 50 minus the through hole 52, the radial slot 54, the circumferential slot 56, the bolt receiving hole and the threaded hole. When the first molding die 120 is closed with the second shaft coupling member blank 51 received therein, a chamber is 122 is defined between the planar surface portion 60 of the second shaft coupling member blank 51 (excluding the parts where the second claws 62 are formed) and the opposing inner surface of the first molding die 120.

Molten elastomeric material under pressure is injected into the chamber 122, and vulcanized therein. As a result, the second elastomer member 86 is formed on the planar surface portion 60 of the second shaft coupling member blank 51 as a layer of a prescribed thickness.

If the first molding die 120 is provided with a pair of cavities so that two blanks can be processed at the same time, the bonding of the second elastic member 84 to the first shaft coupling member blank 21 by vulcanization and the bonding of the second elastic member 86 to the second shaft coupling member blank 51 by vulcanization can be performed simultaneously.

Figure 3:
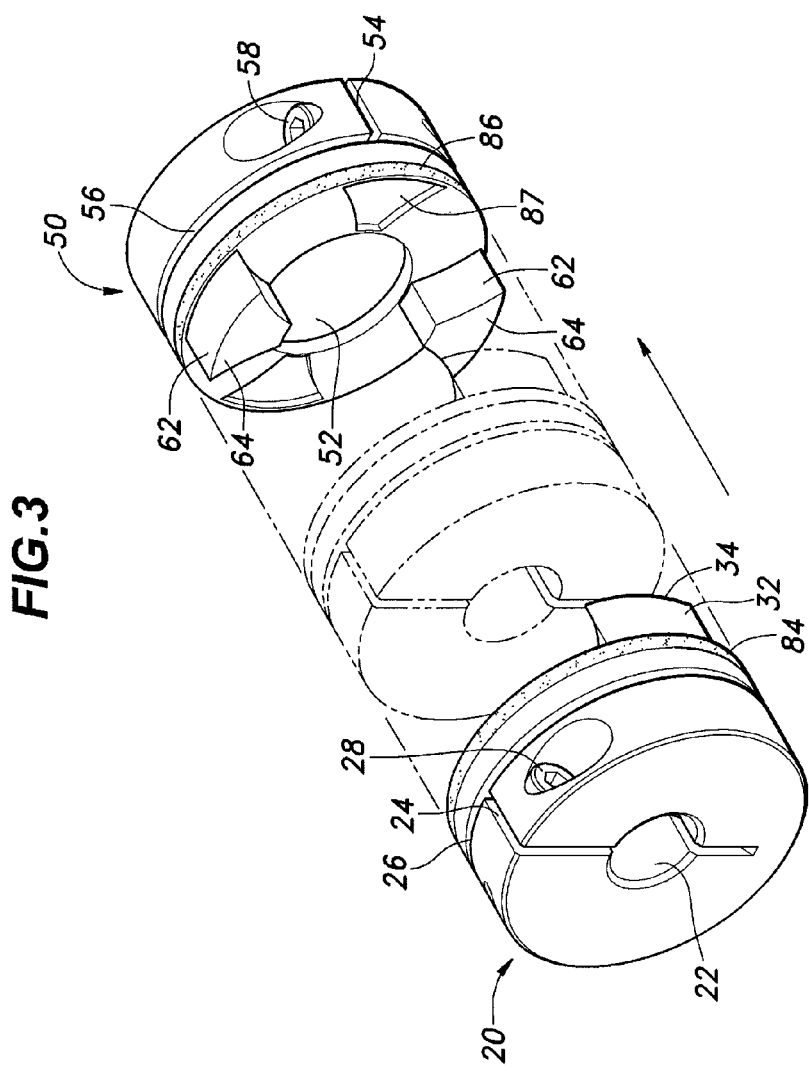
FIG. 3 is an exploded perspective view of the flexible shaft coupling with a first elastomer member omitted from illustration.

As a result of the preceding steps, the first shaft coupling member blank 21 is provided with the second elastomer member 84 which is bonded to the planar surface portion 30 thereof (excluding the parts where the first claws 32 are formed) as a layer of a prescribed thickness, and the second shaft coupling member blank 51 is provided with the second elastomer member 86 which is bonded to the planar surface portion 60 thereof (excluding the parts where the second claws 62 are formed) as a layer of a prescribed thickness, as shown in FIG. 3.

To angularly position the first and second shaft coupling member blank 21 and 51 with respect to the rotational direction as will be required in the following step, the surface of the second elastomer member 84 opposing the planar surface portion 60 of the second shaft coupling member blank 51 is formed with a pair of recesses 85 (see FIG. 2) configured to receive the tips of the corresponding second claws 62, and the surface of the second elastomer member 86 opposing the planar surface portion 30 of the first shaft coupling member blank 21 is formed with a pair of recesses 87 (see FIG. 2) configured to receive the tips of the corresponding first claws 32. These recesses 85 and 87 are provided for the purpose of angularly positioning the two shaft coupling member blanks 21 and 51 relative to each other during the manufacturing process, and may be so shallow that any substantial torque transmission is not achieved by the first and second claws 32 and 34 fitting into the corresponding recesses 85 and 87 partly owing to the softness of the material of the second elastomer members 84 and 86.

In the illustrated embodiment, the end surfaces 34 and 64 of the first and second claws 32 and 62 are not bonded to the bottom surfaces of the recesses 85 and 87, respectively. It may be advantageous in avoiding localized stresses when accommodating the positional deviations between the two shaft coupling members 20 and 50. However, the end surfaces 34 and 64 of the first and second claws 32 and 62 may also be bonded to the bottom surfaces of the recesses 85 and 87, respectively, without departing from the spirit of the present invention. As a matter of fact, these recesses 85 and 87 may be omitted without departing from the spirit of the present invention if other means for angularly positioning the two shaft coupling member blanks 21 and 51 relative to each other during the manufacturing process is provided.

Figure 2:
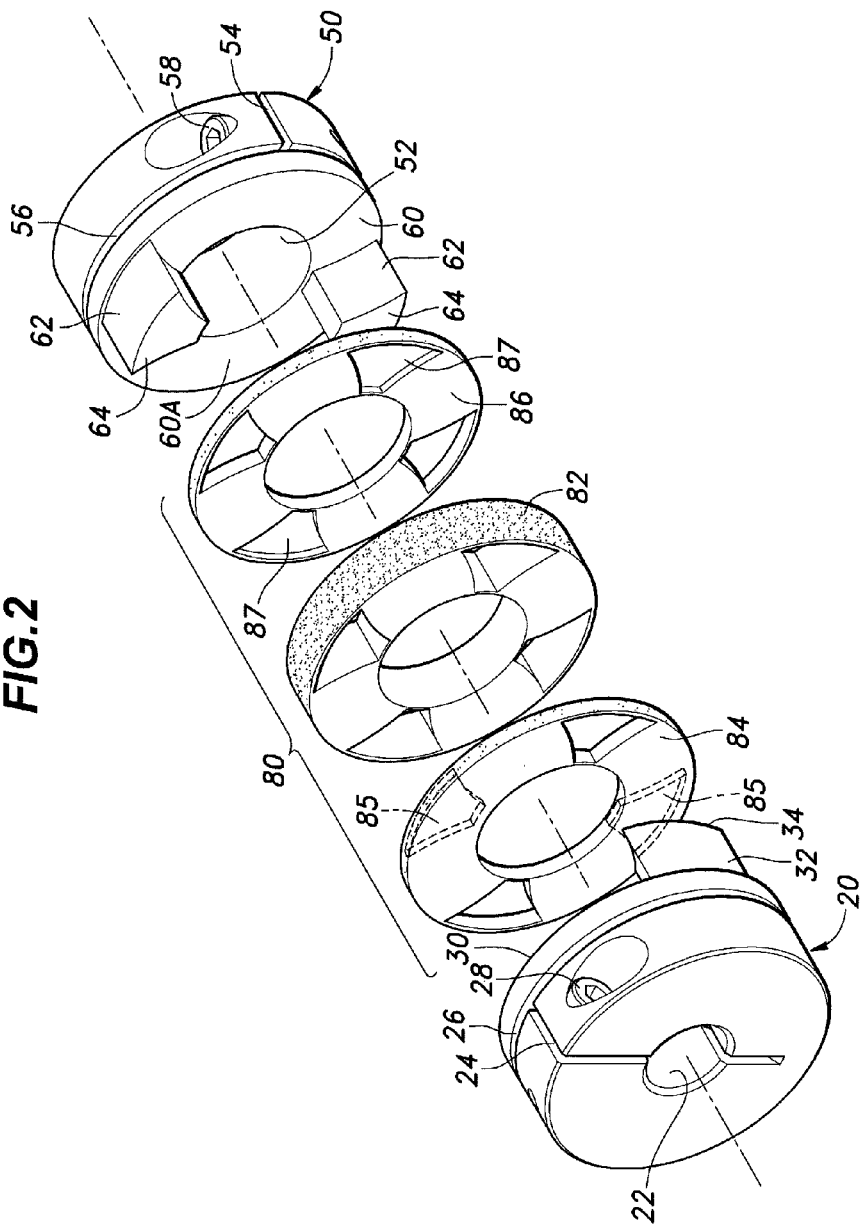
FIG. 2 is an exploded perspective view of the flexible shaft coupling according to the present invention.
Figure 5:
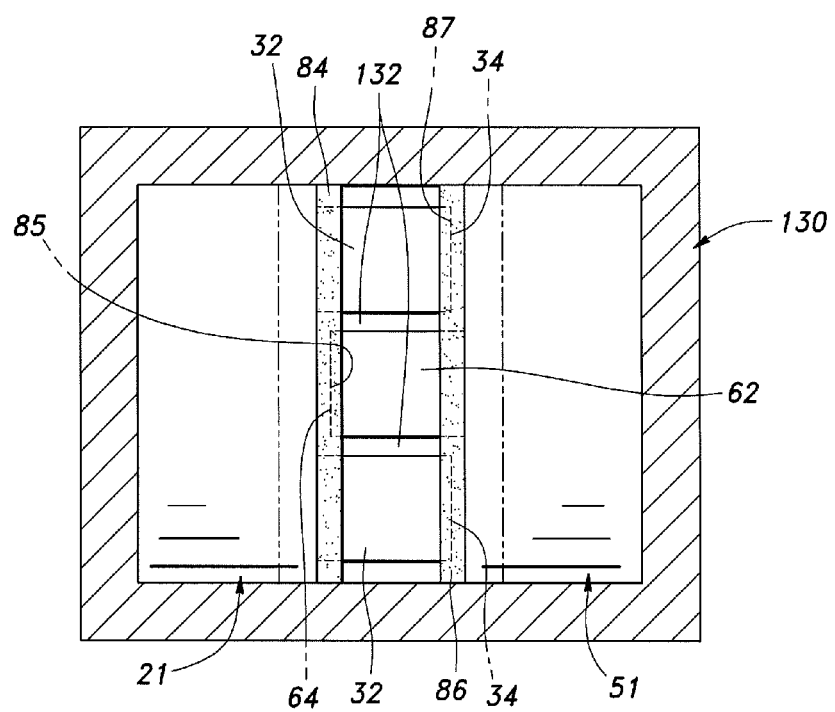
FIG. 5 is a diagram showing a second step of the method of manufacturing the flexible shaft coupling using a second molding die according to the present invention.

Thereafter, as a second step, the two shaft coupling member blanks 21 and 51 having the second elastomer members 84 and 86 bonded thereto by vulcanization are placed in a second molding die 130 consisting of two halves as shown in FIG. 5 in a same positional relationship as in the completed state shown in FIG. 1. The two shaft coupling member blanks 21 and 51 may be positioned such that the first and second claws 32 and 62 are angularly offset by 90 degrees from each other in the rotational direction by placing the tips of the first claws 32 in the corresponding recesses 87 and the tips of the second claws 62 in the corresponding recesses 85.

With the end surfaces 34 of the first claws 32 abutting the bottoms of the positioning recesses 87 of the second elastomer member 86 and the end surfaces 64 of the second claws 62 abutting the bottoms of the positioning recesses 85 of the second elastomer member 84, a chamber 132 is defined between each pair of circumferentially opposing surfaces of the first and second claws 32 and 62.

Molten elastomeric material under pressure is injected into the chambers 132 via gates (not shown in the drawings) provided in suitable parts of the second molding die 130, and vulcanized therein. As a result, the first elastomer member 82 having a relatively high rubber hardness is formed between the circumferentially adjoining surfaces of the first and second claws 32 and 62 so as to fill the gaps therebetween.

As a result, the first elastomer member 82 is bonded to the circumferentially opposing surfaces of the first and second claws 32 and 62 by vulcanization, and the second elastomer members 84 and 86 are bonded to the planar surface portions 30 and 60 of the first and second shaft coupling member blanks 21 and 51. Furthermore, the first and second elastomer members 82, 84 and 86 are bonded to one another at the opposing axial end surfaces thereof by vulcanization.

As a result, the flexible shaft coupling 10 is cylindrical in shape, and is provided with a smooth profile without any recess or protrusion defined on the outer surface thereof.

As a finishing step, the first shaft coupling member 20 is completed by forming the through hole 22, the radial slot 24, the circumferential slot 26, the bolt receiving hole (not shown in the drawing) and the threaded hole (not shown in the drawing) in the first shaft coupling member blank 21 by machining, and the second shaft coupling member 50 is completed by forming the through hole 52, the radial slot 54, the circumferential slot 56, the bolt receiving hole (not shown in the drawing) and the threaded hole (not shown in the drawing) in the second shaft coupling member blank 51 by machining. Thereby, the flexible shaft coupling 10 shown in FIG. 1 is completed.

Although the present invention has been described in terms of a preferred embodiment thereof, it is obvious to a person skilled in the art that various alterations and modifications are possible without departing from the scope of the present invention.

For instance, the first elastomer member 82 is not required to be provided over the entire axial length of the circumferentially opposing surfaces of the first and second claws 32 and 62, but may be provided only in part of the axial length thereof. The numbers of the first and second claws 32 and 62 are not limited to two, but may also be one, three or more.

The structure for fixing the first and second shaft members 100 and 110 to the first and second shaft coupling members 20 and 50 is not limited to that involving the closing of the radial slot by a threaded bolt but may also consist of a key and a fixing screw, a spline coupling, a wedge mechanism, and so on.

It is also possible to provide the second elastomer member 84, 86 on only one of the first and second shaft coupling members 20 and 50.

The angular positioning of the first and second shaft coupling member blanks 21 and 51 in the second manufacturing step of the flexible shaft coupling 10 can also be accomplished by forming a flat surface on the outer circumferential surface of each of the first and second shaft coupling member blanks 21 and 51 and a complementary flat surface for engaging the flat surface of the blank in the corresponding surface of the molding die for the second manufacturing step. It is also possible to achieve the required positioning in different ways.

The manufacturing method for the flexible shaft coupling is not limited by the illustrated embodiment. For instance, a first shaft coupling member 20 complete with the first claws 32, the through hole 22, the radial slot 24, the circumferential slot 26, the bolt receiving hole and the threaded hole and a second shaft coupling member 50 complete with the second claws 62, the through hole 52, the radial slot 54, the circumferential slot 56, the bolt receiving hole and the threaded hole may be prepared for use in the first step. In such a case, the relative angular positioning of the first and second shaft coupling members 20 and 50 may be accomplished through the use of the radial slots 24 and 54. As for the through holes 22 and 52, it is preferable to be formed in the finishing step following the second step in order to achieve a favorable coaxiality.

It is also possible to assemble the first and second elastomer members 82, 84 and 86 to the first and second shaft coupling members 20 and 50 as separate rubber components.

The various components used in the foregoing embodiment may not be entirely essential, but may be partly omitted as required without departing from the spirit of the present invention. The contents of the original Japanese patent application on which the Paris Convention priority claim is made for the present application as well as the contents of the prior art references mentioned in this application are incorporated in this application by reference.

GLOSSARY 10 flexible shaft coupling
20 first shaft coupling member
30 planar surface portion
32 first claw portion
50 second shaft coupling member
60 planar surface portion
62 second claw portion
80 elastomer member
82 first elastomer member
84 second elastomer member
86 second elastomer member
100 first shaft member
110 second shaft member
120 first molding die
122 chamber
130 second molding die
132 chamber

The invention claimed is:

1. A flexible coupling, comprising a first shaft coupling member fixed to an end of a first shaft member; a second shaft coupling member fixed to an end of a second shaft member; and an elastomer member connecting the first and second shaft coupling members to each other, wherein:
the first and second shaft coupling members are provided with surface portions opposing each other;
the first shaft coupling member is provided with a first claw projecting from the surface portion thereof toward the surface portion of the second shaft coupling member;

the second shaft coupling member is provided with a second claw projecting from the surface portion thereof toward the surface portion of the first shaft coupling member;

the first and second claws are angularly displaced from each other so as to be circumferentially spaced from each other to define a circumferential gap therebetween, and are axially spaced from the opposing surface portions of the second and first shaft coupling members, respectively; and a first elastomer member having a first rubber hardness is circumferentially interposed between the first and second claws to fill the circumferential gap between the first and second claws, and a second elastomer member having a second rubber hardness lower than the first rubber hardness is interposed between the surface portion of the first shaft coupling member and the second claw and/or between the surface portion of the second shaft coupling member and the first claw.

2. The flexible coupling according to claim 1, wherein the surface portion of the first shaft coupling member opposes the end surface of the second claw and the surface portion of the second shaft coupling member opposes the end surface of the first claw, in each case by planes that are parallel to each other and perpendicular to the axial direction, and the second elastomer member is interposed between the mutually opposing planes as a layer.

3. The flexible coupling according to claim 1, wherein the first elastomer member is bonded to at least a part of the circumferentially opposing surfaces of the first and second claws, the second elastomer member is bonded to the surface portion of the first shaft coupling member and/or the surface portion of the second shaft coupling member, and the first and second elastomer members are provided with mutually opposing axial end surfaces that are bonded to each other.

4. The flexible coupling according to claim 3, wherein at least a part of the bonding is performed by vulcanization.

5. A method of manufacturing the flexible coupling according to claim 1, comprising:

a first step of bonding the second elastomer member to one of the surface portions of the first and second shaft coupling members by using a first molding die; and a second step of placing the first and second shaft coupling members in finished positions thereof, and fixedly filling the first elastomer member in the circumferential gap defined between the first and second claws by vulcanization in a second molding die.

* * * * *